United States Patent [19]

Copp

[11] Patent Number: 4,762,209
[45] Date of Patent: Aug. 9, 1988

[54] DRUM BRAKE ASSEMBLY AND SHOE HOLD-DOWN AND RETRACTION SPRING THEREFOR

[75] Inventor: Douglas M. Copp, West Milton, Ohio

[73] Assignee: General Motors Corporation, Detroit, Mich.

[21] Appl. No.: 56,041

[22] Filed: May 29, 1987

[51] Int. Cl.⁴ .............................................. F16D 51/26
[52] U.S. Cl. .................................... 188/328; 188/216; 188/340; 192/101
[58] Field of Search ............... 188/340, 216, 328, 329, 188/341; 192/101

[56] References Cited

U.S. PATENT DOCUMENTS

| 2,509,643 | 5/1950 | Hoisse | 188/340 |
| 3,554,332 | 1/1971 | Harrison | 188/216 X |
| 4,130,189 | 12/1978 | Katagiri et al. | 188/216 X |
| 4,216,850 | 8/1980 | Kizaki | 188/216 |

FOREIGN PATENT DOCUMENTS

| 823252 | 12/1951 | Fed. Rep. of Germany | 188/216 |
| 1078712 | 8/1967 | United Kingdom | 188/216 |
| 2074263 | 10/1981 | United Kingdom | 188/328 |

Primary Examiner—George E. A. Halvosa
Attorney, Agent, or Firm—D. D. McGraw

[57] ABSTRACT

A single generally U-shaped wire spring has a partial loop formed in the center and fitting over an anchor for a leading-trailing shoe assembly. Each arm of the spring extends along the web of a shoe and terminates in a hook end which fits within a slot in the associated shoe web. The slots are so located in the web to obtain the desired distribution of spring loads on the adjuster/strut assembly and on the anchor plate. The spring will return the brake shoes to the adjuster/strut assembly after actuation of the wheel cylinder during service brake function; retain the lower ends of the shoes against the anchor plate; and hold the shoes against the backing plate by the force component of the spring wire acting against the bottom side of the cable support and against the top of the outer ramp of the anchor plate, resulting in a spring load directed onto the web of each shoe.

1 Claim, 1 Drawing Sheet

DRUM BRAKE ASSEMBLY AND SHOE HOLD-DOWN AND RETRACTION SPRING THEREFOR

The invention relates to a drum brake assembly of the lead-trailing shoe type in which a single piece spring installed as a part of the assembly holds down the brake shoe assemblies against the backing plate and also retracts the shoes after brake actuation. The single piece spring also retains the lower ends of the shoes against the anchor plate. This arrangement eliminates the need for separate shoe hold-down springs and separate upper and lower return springs, resulting in a significant reduction in parts and labor for assembly.

IN THE DRAWING

Figure 1:
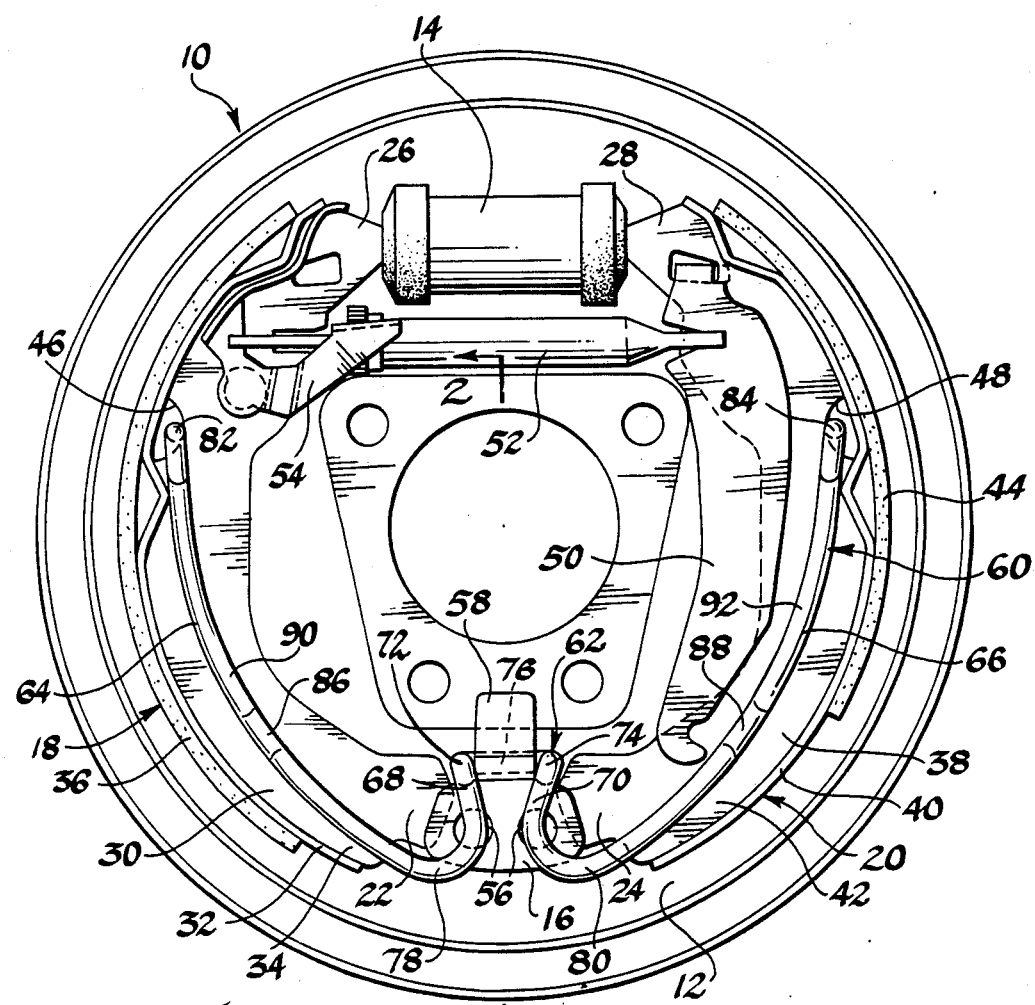
FIG. 1 is a side elevation view of a drum brake assembly embodying the invention.
Figure 3:
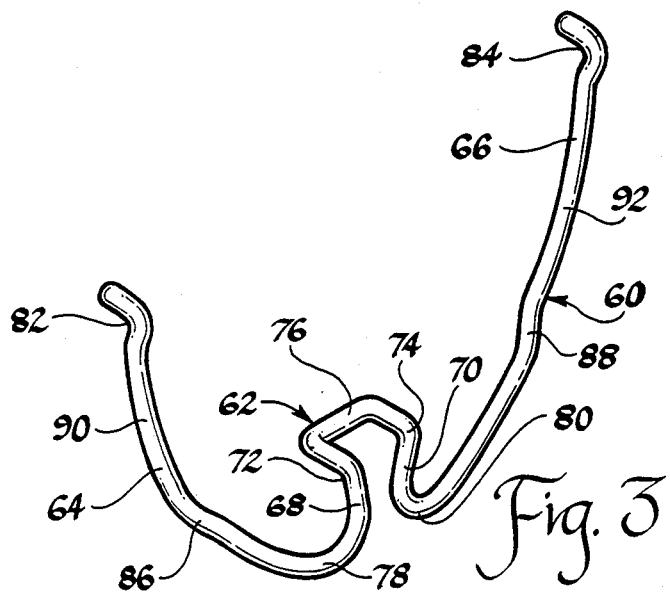
FIG. 3 is a perspective view of the single piece spring of the invention.

The drum brake assembly 10 includes a backing plate 12 having mounted thereon a wheel cylinder 14 and an anchor 16 circumferentially opposite the wheel cylinder. A pair of brake shoe assemblies 18 and 20 are also mounted on the backing plate. The shoe assemblies respectively have adjacent ends 22 and 24 engaging the anchor 16 and another set of adjacent ends 26 and 28 engaging the wheel cylinder for actuation. Shoe assembly 18 includes the shoe 30, formed by shoe rim 32 and shoe web 34, and the brake lining 36 mounted on the shoe rim. Shoe assembly 20 includes the shoe 38, formed by rim 40 and web 42, and the brake lining 44 mounted rim 40. Shoe web 34 has a slot 46 formed therethrough immediately adjacent the rim 32 and positioned somewhat nearer the wheel cylinder 14 than the anchor 16. Similarly, shoe web 42 has a slot 48 formed therein and similarly positioned. The particular drum brake assembly 10 illustrated is one which also has an arrangement for mechanical actuation for parking brake purposes. Therefore the parking brake arm 50 is mounted on web 42 of shoe assembly 20 so as to be actuated as is well known in the art. For this purpose the spreader strut 52 is connected with shoe assembly 20 and engageable by arm 50 for such actuation. Spreader strut 52 is also engaged with the web 34 of shoe assembly 18. A suitable adjuster mechanism 54 is also provided as a part of the shoe assembly 18 and the spreader strut 52. Anchor 16 is suitably secured to the backing plate 12 by rivets 56, for example, and has a tab-like portion 58 extending therefrom toward wheel cylinder 14 and spaced laterally from the backing plate 12. The tab-like portion 58 may also function as a parking brake actuating cable support. However, the parking brake actuating cable is not illustrated.

Figure 2:
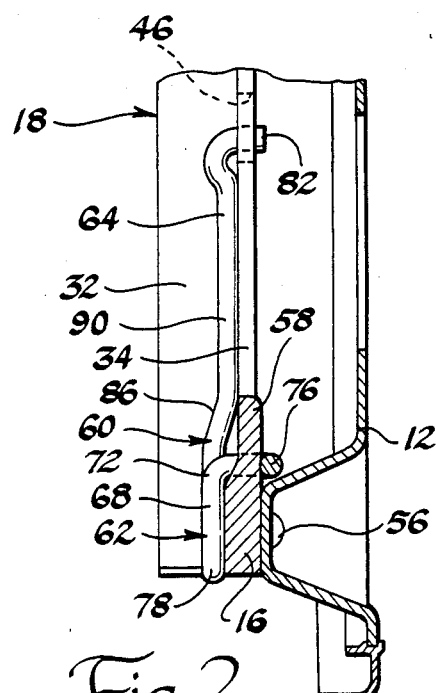
FIG. 2 is a fragmentary cross-section view taken in the direction of arrows 2—2 of FIG. 1.

The spring 60 is a U-shaped brake shoe return and hold-down spring which when installed provides all of the functions of shoe hold-down springs and shoe retracting springs. Spring 60 has a center loop section 62, a first spring arm 64 and a second spring arm 66 extending from the center loop section. The center loop section has loop arms 68 and 70 which respectively connect with spring arms 64 and 66 at bends 72 and 74 so that the loop arms extend toward the backing plate. The loop arms 68 and 70 are connected by a loop back section 76 which when installed in the drum brake assembly extends generally parallel to the basic plane of the backing plate 12. The loop arms 68 and 70 are connected to spring arms 64 and 66 at bends 78 and 80, respectively, so that each spring arm extends in generally arcuate opposed directions from the center loop section 62. Arms 64 and 66 respectively terminate with hooked ends 82 and 84. Spring arms 64 and 66 are also preferably provided with double bends 86 and 88 which offset the outer portion of the arms 64 and 66 from the plane of the loop arms 68 and 70, as is better seen in FIG. 2, so that the spring arm portions 90 and 92 are in engagement with the outer sides of their respectively associated shoe webs 34 and 42 after assembly.

The drum brake is assembled by placing the shoe assemblies 18 and 20 in position so that their ends engage the wheel cylinder 14 and the anchor 16 as shown with strut 52 and adjuster mechanism in place. The spring 60 is then placed in position by first positioning the center loop section 62 over the anchor tab section 58 as shown and moving the spring downwardly to seat the loop section on the anchor. The spring hooked ends 82 and 84 are then inserted into the slots 46 and 48. This action causes spring force to be exerted on the shoes toward the backing plate with the center loop section 62, and particularly the loop back 76 and the loop arms 68 and 70, exerting a spring reaction force on the anchor 16. The spring arms 64 and 66 had to be spread apart to some extent in order to insert their hooked ends in the slots and therefore the spring arms also exert forces urging the shoe assemblies 18 and 20 toward the retracted position shown. Due to the particular arrangement of the center loop section 62 of the spring, as well as the various bends 72 and 74, 78 and 80, and 86 and 88, the spring also exerts a force on each shoe assembly continually urging that shoe assembly toward the backing plate 12 as above noted. Thus the spring performs the function of hold-down springs which have been commonly provided for each shoe assembly, as well as retraction springs which in a leading/trailing brake shoe assembly are normally provided adjacent the upper shoe ends 26 and 28 and also the lower shoe ends 22 and 24. The slots 46 and 48 are so located in the shoe webs, and the spring arms 64 and 66 are of such a length, that the retraction force of the spring is exerted on the shoes to continually urge the shoe ends into engagement with the wheel cylinder and the anchor. Furthermore, the positioning of the portions of the spring arms 64 and 66 adjacent their bends 78 and 80 provide some security against the shoe ends 22 and 24 being removed laterally from the anchor at any time. This action is further enforced by the engagement of the spring arm portions 90 and 92 with the outer side of the shoe webs 34 and 42, as is better shown in FIG. 2.

This arrangement provides for a quick assembly operation by employing a single spring instead of the assembly of at least four springs in the typical leading-trailing brake shoe assembly, with the single spring performing all the functions of the previous four. The spring is quickly removed and replaced at any time that the shoes are required to be removed and replaced.

The embodiments of the invention in which an exclusive property or privilege is claimed are defined as follows:

1. A drum brake assembly comprising:
   a backing plate having mounted thereon a wheel cylinder and an anchor circumferentially opposite said wheel cylinder, a pair of brake shoe assemblies having a first set of adjacent ends engaging said anchor and a second set of adjacent ends engaging said wheel cylinder for actuation, each of said brake shoe assemblies including a shoe web having a slot formed therein and located nearer said wheel cylinder than said anchor, and a single generally U-shaped spring combining the functions of shoe hold-down and shoe retracting springs and shoe guide means, said anchor having a tab-like portion extending toward said wheel cylinder in spaced relation to said backing plate;

said single spring having a center loop section and first and second spring arms extending from said center loop section, said center loop section having loop arms connecting with said first and second spring arms in bent relation and extending toward said backing plate and a loop back section connecting said loop arms, said loop back section being positioned between said anchor tab-like portion and said backing plate with said anchor tab-like portion being engaged by said loop back section and providing spring reaction to spring force exerted thereon in the direction away from said backing plate for shoe hold-down, said loop arms being in spring force engaging relation with said anchor on the side thereof opposite said backing plate with the spring force exerted on said anchor by said loop arms being in the direction toward said backing plate, said spring arms extending in bent relation from said loop arms in generally arcuate opposed directions and having hooked ends received in said shoe web slots in spring loaded relation, said spring arms also having double bend offsets intermediate said loop arms and said hooked ends, at least portions of said spring arms from said double bend offsets to said hooked ends being in spring-engaging relation with said shoe webs and exerting shoe hold-down forces on said shoe webs from first points thereon located nearer said wheel cylinder than said anchor to second points thereon located nearer said anchor than said wheel cylinder, said second points being adjacent to said shoe ends engaging said anchor, said spring arms providing shoe web guides keeping said shoe webs in guided relation to said anchor, said spring being spring loaded so as to continually urge said brake shoe assemblies toward the retracted position and also in resilient hold-down position against said backing plate.

* * * * *